Feb. 21, 1950 A. H. BENSON 2,497,857
AMPHIBIOUS EQUIPMENT FOR VEHICLES
Filed Jan. 27, 1947 2 Sheets-Sheet 1
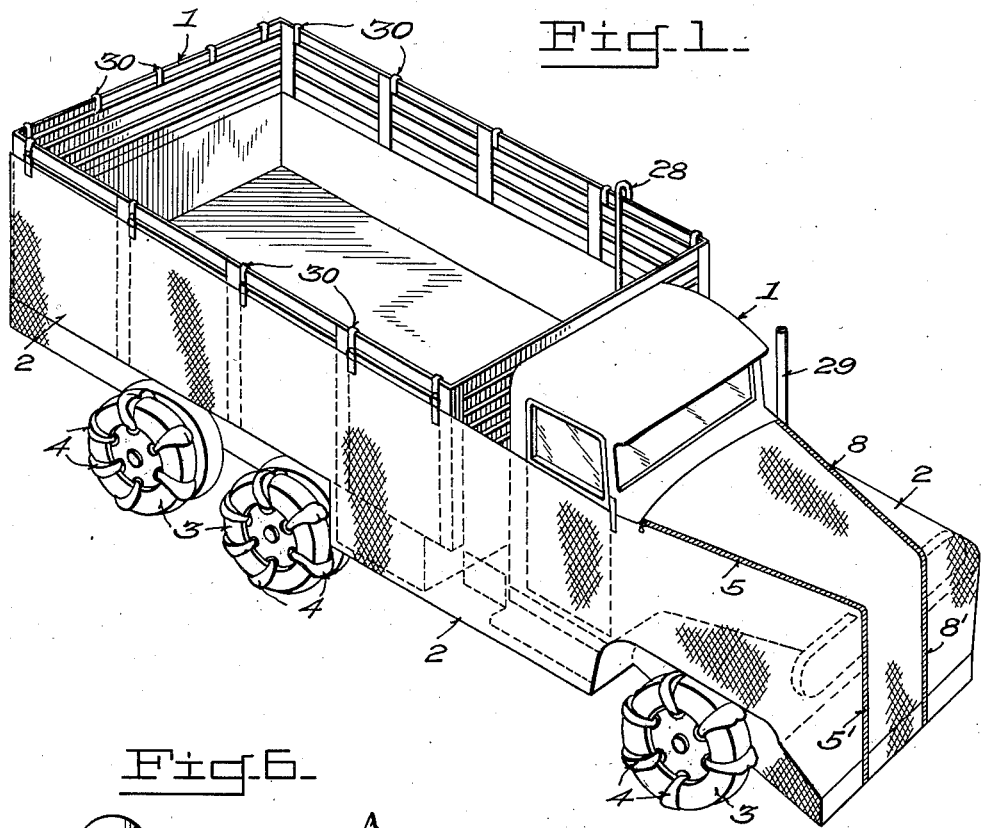
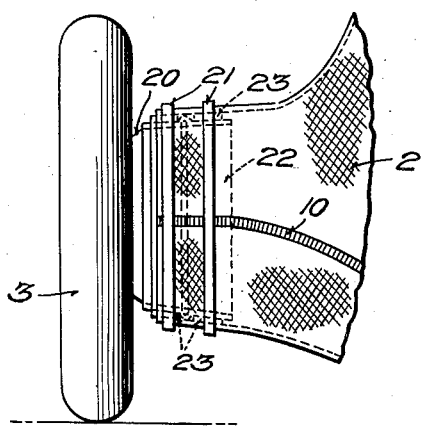
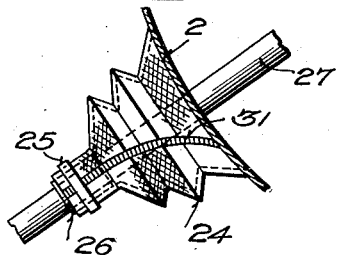
INVENTOR.
ALBERT H. BENSON,
BY
ATTORNEYS Feb. 21, 1950          A. H. BENSON          2,497,857
AMPHIBIOUS EQUIPMENT FOR VEHICLES
Filed Jan. 27, 1947          2 Sheets-Sheet 2
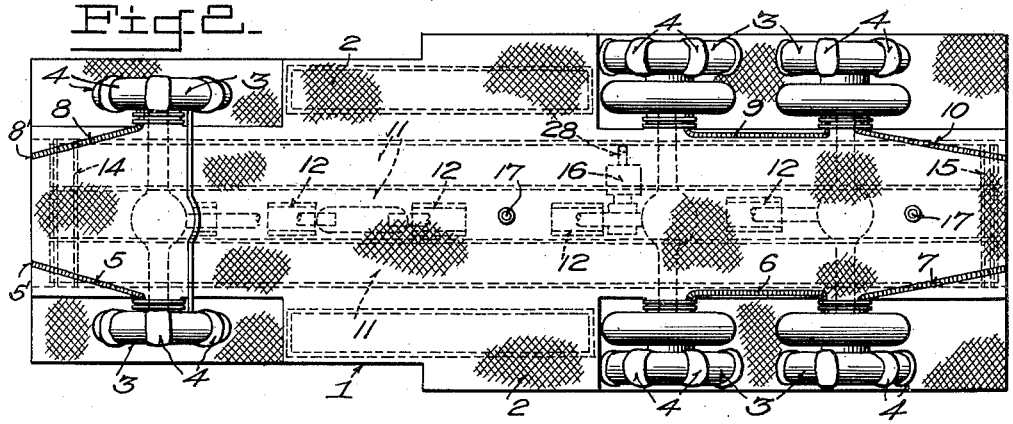
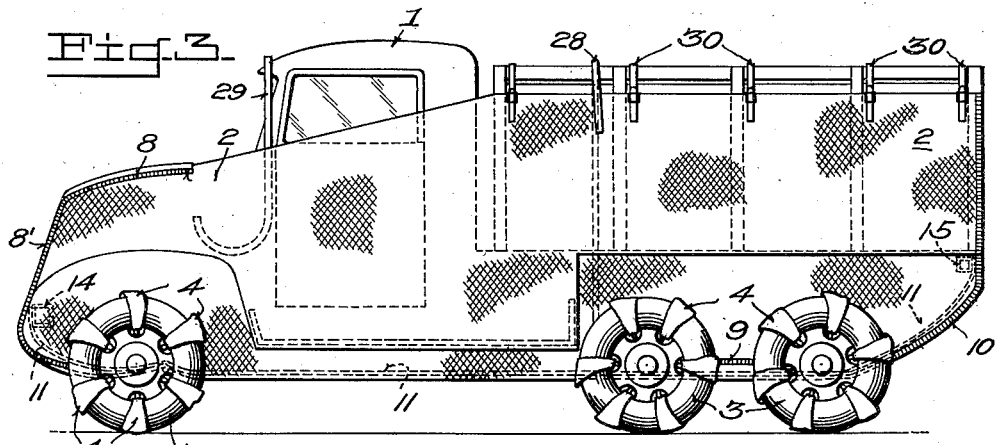
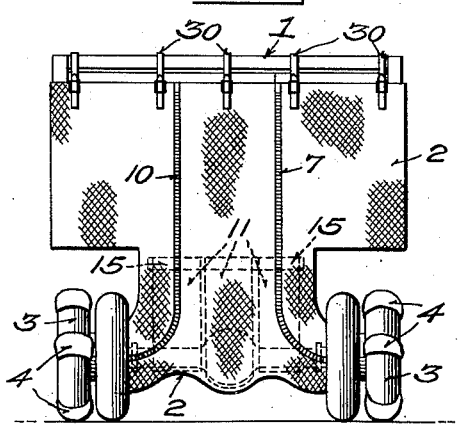
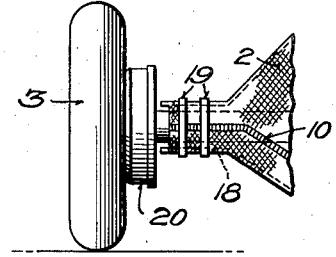
INVENTOR.
ALBERT H. BENSON,
BY
*ATTORNEYS*

Patented Feb. 21, 1950

2,497,857

UNITED STATES PATENT OFFICE 2,497,857

AMPHIBIOUS EQUIPMENT FOR VEHICLES

Albert H. Benson, Hopewell, N. J.

Application January 27, 1947, Serial No. 724,691

21 Claims. (Cl. 115—1)

(Granted under the act of March 3, 1883, as amended April 30, 1928; 370 O. G. 757)

The invention herein described and claimed may be manufactured and used by or for the Government for governmental purposes without the payment to me of any royalty thereon.

The present invention relates to equipment adapted to be secured to motor vehicles ordinarily designed for land transportation, whereby such vehicles are made amphibious either temporarily or for such an extended period of time as desired.

Many occasions arise where it is extremely desirable that trucks or other motor vehicles be easily and quickly converted to amphibious vehicles in order that these vehicles may cross rivers or deep bodies of water where, in the absence of bridges or other crossing means, a lengthy detour or a long or even permanent halt in motor transportation because of such water barriers would otherwise be necessitated. Thus during flood or other conditions, or for example in a campaign involving the rapid advance of an army, it may be of the utmost importance that motor vehicle transportation and the flow of supplies, equipment and personnel carried thereby be uninterrupted despite a lack of bridges or other means of circumventing rivers or bodies of water too deep for fording by ordinary driving therethrough yet lying directly across the required route of travel.

It is accordingly an object of this invention to provide portable means which may be carried by a motor vehicle for quickly converting the latter to an amphibious vehicle for such a length of time as desired.

It is a further object of this invention to provide amphibious equipment including a form-fitting slip cover of water-repellent material for quick and easy attachment thereof to and encasing the chassis and hood of a motor vehicle but leaving the traction members exposed, whereby, after attachment of said cover, said vehicle may travel on land or on water.

It is a further object of this invention to provide amphibious equipment for a motor vehicle comprising a form-fitting slip cover of water-repellent fabric equipped with slide fasteners and water-tight connections for encasing the entire chassis and hood of a motor vehicle, but leaving the wheels thereof exposed for traction.

It is a further object of the present invention to provide, in combination, a motor vehicle and amphibious equipment therefor comprising a readily attachable and detachable form-fitting slip cover of water-repellent material encasing the chassis and hood of the motor vehicle with only the wheels thereof projecting outside of the cover for traction, whereby with the slip cover attached the motor vehicle may travel on land or on water as required.

The nature of the invention as well as other objects and advantages thereof will be apparent from a description of a specific embodiment of the invention as illustrated in the accompanying drawing in which:

Figure 1 is a perspective view of my invention with respect to a motor truck.

Figure 2 is a bottom plan view of the invention illustrated in Figure 1.

Figure 3 is a side elevational view of the invention illustrated in Figure 1.

Figure 4 is a rear end elevational view of the invention illustrated in Figure 1.

Figure 5 is a view in elevation of one of the wheels including a portion of an axle housing of the vehicle as shown in the foregoing figures and illustrating the construction of the seal of the slip cover about that axle housing.

Figure 6 is a view similar to Figure 5, but illustrating an alternative type of construction of the seal.

Figure 7 is a view, partly in section, showing a portion of one of the steering arms of a vehicle and one type of seal construction of the slip cover about the arm.

Reference to these views will now be made by use of like characters which are employed to designate corresponding parts throughout.

As shown in Figure 1, a vehicle generally designated by numeral 1, and in this specific illustration a motor truck, has attached thereto and encasing the chassis and hood thereof, a form-fitting slip cover 2 of water-repellent fabric, but leaving traction members or wheels 3 exposed or protruding therefrom.

Exposed traction members or wheel 3 may have secured thereon propulsion members 4, for the purpose of providing the desired amount of traction in water, such as disclosed and claimed in copending application, Serial No. 592,436, of myself and Francis A. Jones, filed May 7, 1945, and now abandoned, for Propelling member for amphibious vehicles.

Form-fitting slip cover 2 is constructed of any suitable fabric or material of sufficient strength which is, inherently or as a result of treatment or impregnation, waterproof, substantially waterproof, or water-repellent. One such material is suitably strong, water-repellent canvas. Slip cover 2 is fitted with slide fasteners which may be of conventional type as indicated at 5, 6, 7, 8, 9 and 10, to facilitate attachment of the slip cover to the vehicle, and in order to have the slide fasteners as waterproof as possible the mating elements or teeth along which the sliders operate are preferably embedded in a suitable plastic material, such as rubber or a synthetic resin such as a vinyl resin having suitable flexibility, that part of the mating elements or teeth being left exposed only at the mating portions thereof. That portion of slip cover 2 which extends over the hood of the engine is provided with slide fasteners 5 and 8 having portions 5' and 8' thereof substantially parallel in front of the radiator and spaced to permit a strip of slip cover 2 about the width of the hood to be rolled down from the top of the hood to a point below the radiator to assure good cooling of the motor on the highway or when travelling on land.

Slip cover 2 is held up against the undersides of the mud guards and similar recessed or undercut portions of the body of vehicle 1 by spaced tie strips 30, as shown in Figures 1, 3 and 4, which are secured to the slip cover and tied to eyes mounted for this purpose at suitable points along the body of the vehicle. In the bottom of slip cover 2, secured in openings therein, are one or more drains 17 of usual construction and comprising in each an opening containing a manually operable drain plug, preferably threaded, which is manipulated from underneath the vehicle to open the drain and thus permit any water which may have entered the slip cover during a period of immersion to drain therefrom upon a resumption of land travel.

Slip cover 2 is fitted over wheels 3 by means of slits closed by the slide fasteners 5, 6, 7, 8, 9 and 10 to enable sealing of the cover about the axle housing and also about the fluid connection for the hydraulic brake. One type of seal about one end of one of the axle housings is illustrated in Figure 5 in which a band 18 of fairly soft pliable rubber or other suitable material, about one-half inch thick and two or three inches in width is attached about the housing adjacent one end thereof. With its slit closed by the slide fastener, a portion of that part of slip cover 2 enclosing the axle housing is clamped about band 18 on the housing by means of metallic binding straps 19 to provide a water-tight seal. In Figure 6, showing an alternative type of seal construction, an outwardly flaring metallic flange 22 of conical section is attached about the outer periphery of the backing plate or stationary brake drum 20. In this construction, spaced bands 23 of fairly soft pliable rubber or other suitable material are attached about the periphery of flange 22, and slip cover 2 is clamped about bands 23 on flange 22 by means of metallic binding strips 21, thus enclosing the entire axle housing and the fluid connection to the hydraulic brake (not shown).

In providing a water-tight seal about the steering arms or links, a preferred type of seal construction is shown in Figure 7. At an opening in slip cover 2 through which steering arm 27 extends outwardly, a member 24 of generally conical section and of flexible water-repellent material or fabric preferably similar to that of slip cover 2 is secured in water tight connection at its large base end to slip cover 2, steering arm 27 extending therethrough. At a suitably spaced point on the exterior portion of steering arm or link 27 is secured a band 26 of soft pliable rubber or other suitable material, and the small end of member 24 is clamped about band 26 by means of metallic binding strap 25. The point on steering arm 27 selected for attachment of band 26 is suitably such that with member 24 attached to the latter, member 24 is in substantially less than fully extended form, somewhat resembling a bellows, whereby exposed steering arm or link 27 is freely movable as is necessary, and yet a water-tight seal is provided to prevent leakage of water into slip cover 2 where steering arm 27 extends therethrough. As an aid in attaching slip cover 2 and member 24 about steering arm 27, a slit, closed by slide fastener 31 is provided in member 24 and slip cover 2. The slit closed by slide fastener 31 may, if desired, be an extension (not shown) of slide fastener 5 or 8 from the opposite side of the front axle housing.

In a preferred embodiment of my invention, one or more brackets 12 of generally U-shape design are permanently mounted at the ends of the legs thereof to the underside of the vehicle body to form an elongated open housing for the universal joint whereby rubbing of the slip cover against the latter is prevented. Also, secured immediately below and to the underside of the vehicle body is a bilge pump 16 of conventional type, preferably self priming, with, for example, a 50 gallon per minute discharge rate, permanently connected for operation to and by the drive shaft or drive mechanism of the vehicle. Bilge pump 16 is inside slip cover 2 when the latter is attached to the vehicle with its intake adjacent the inside bottom of the slip cover, and is of suitable capacity to remove water accumulating or accumulated in the bottom of slip cover 2 by forcing such water upward through vertically extending pipe 28 and thence over the side of the vehicle. Extending upwardly from the hood is a vertical exhaust pipe 29 which may be temporarily or permanently connected to the exhaust manifold of the engine in place of the usual exhaust pipe, whereby combustion gases from the engine are exhausted above the vehicle. It is further preferred that the engine, including the ignition system, be waterproofed by means well known in the art.

In order to increase the space between the bottom of slip cover 2 and the underside of the body of the vehicle and thus increase the buoyancy in water, one or more chassis straps 11 of heavy fabric or woven material are provided. As indicated in Figures 2, 3 and 4, chassis straps 11 are secured at one of the ends thereof by any suitable means such as strips and buckles to front bumper 14 of the vehicle and at the other of the ends thereof to cross member 15 of the vehicle frame. Chassis straps 11 are enclosed inside slip cover 2 when the latter is attached, and as previously indicated, when the vehicle is in water hold the bottom of slip cover 2 outwardly from the underside of the body of the vehicle, providing space between the latter and slip cover 2, thus increasing the buoyancy. Although not necessary when the vehicle is in water, it is often desirable when travelling on land with slip cover 2 attached, to connect one or more ordinary fabric straps (not shown) beneath the slip cover to around the topside of the vehicle to prevent any possibility of the bottom of the slip cover rubbing on uneven ground.

Although a 2½ ton, 6 x 6 motor truck has been illustrated, it is to be understood that the invention herein described pertains to all types and sizes of motor vehicles designed for land transportation, slip cover 2 being constructed form-fitting for each particular type and size of vehicle. It follows therefore that in providing for a large number of vehicles of several different types and sizes, the slip covers therefor can be prefabricated in the desired quantity for each particular type and size of vehicle. The slip covers folded and detached may be carried by the vehicles ready for quick attachment when desired. The weight of a particular slip cover will of course, vary with the size of the vehicle for which it is designed, and with the material of which the slip cover is constructed. As illustrative, where a heavy, impregnated, waterproof woven fabric is used as the material for the slip cover, the weight of the slip cover together with three chassis straps of 12 inch wide webbing may weigh approximately 200 pounds for a 2½ ton, 6 x 6 truck as illustrated, approximately 100 pounds for a ¾ ton vehicle, and approximately 60 pounds for a ¼ ton vehicle.

In operation, vehicles equipped in accordance with my invention perform satisfactorily, whether on land or in water, and whether loaded or unloaded. Thus, in an actual test, the 2½ ton, 6 x 6 truck embodying my invention as illustrated and loaded to capacity with scrap iron performed as satisfactorily in water as when empty. When a vehicle incorporating my invention enters a deep body of water, and the approach thereto is a fairly rapid slope, the front end is well off the bottom when the vehicle has proceeded into the water for a distance about equal to its own length. When the vehicle is equipped in addition with the propulsion members attached to the traction members as hereinabove described, a satisfactory speed of 5 to 10 miles per hour may be maintained in water. If not equipped with propulsion members on the traction members, the effect of the traction members per se in water is negligible; however, momentum of the vehicle on entering a small body of water may be sufficient to carry it across, or other propulsion or towing means may be utilized to accomplish crossing of a body of water by a vehicle equipped in accordance with my invention, but minus the propulsion members shown.

Although I have shown and described certain embodiments of my invention, it will be understood that I do not wish to be limited to the exact construction shown and described, but that various changes and modifications may be made without departing from the spirit and scope of my invention as defined in the appended claims.

What I claim is:

1. In combination with a vehicle having land traction members, apparatus converting said vehicle to an amphibious vehicle when attached thereto, said apparatus comprising a readily attachable and detachable form-fitting, flexible, water-repellent slip cover having bottom and upper portions, said slip cover attachably sealingly encasing the lower part of the body including the underside thereof and substantially all of the hood and chassis of said vehicle, excluding said land traction members thereof, said land traction members being outside of said slip cover.

2. In combination with a motor vehicle adapted by only for land travel, attached apparatus converting said vehicle to an amphibious vehicle, said apparatus comprising a readily detachable, form-fitting, water-repellent fabric slip cover having bottom and upper portions sealingly encasing the lower portion including the underside of said vehicle excluding the land traction members thereof, said land traction members being outside of said slip cover, and means permitting removal of water from the inside bottom portion on said slip cover.

3. In combination with a motor vehicle having land traction members, amphibious equipment for said vehicle and carried thereby, said equipment comprising a form-fitting, flexible, water-repellent slip cover having openings therein and adapted attachedly to sealingly encase substantially all of the lower portion including the underside of said vehicle, with parts of said vehicle associated with said traction member sealingly extending through said openings whereby said traction members are outside of said slip cover, and means for readily operatively attaching or detaching said slip cover to said vehicle, said vehicle with said equipment attached thereto being amphibious.

4. The combination as set forth in claim 3 wherein said means for readily operatively attaching or detaching said slip cover comprises slits therein closable substantially water-tightly by slide fasteners.

5. In combination with a motor vehicle having land traction members, amphibious equipment for said vehicle and carried thereby, said equipment comprising a form-fitting, flexible, water-repellent slip cover having openings therein and adapted attachedly to sealingly encase substantially all of the lower portion including the underside of said vehicle and excluding said traction members, with said traction members being outside of said slip cover and with parts of said vehicle associated with said traction members sealingly extending through said openings, means for readily operatively attaching and detaching said slip cover to said vehicle, and water propulsion members readily attachable on and detachable from said traction members, said vehicle with said equipment attached thereto being amphibious.

6. The combination as set forth in claim 5, wherein said means for readily operatively attaching or detaching said slip cover comprises slits therein closable substantially water-tightly by slide fasteners.

7. In combination with a land vehicle, amphibious equipment comprising a readily detachable, form-fitting, flexible, water-repellent slip cover sealingly encasing substantially all of the lower portion including the underside and excluding the land traction members of said vehicle, said land traction members being outside of said slip cover, whereby said vehicle is amphibious.

8. In combination with a wheeled motor vehicle, amphibious equipment comprising a readily detachable, form-fitting, flexible, water-repellent slip cover sealingly encasing the lower part including the underside of the body and substantially all of the hood and chassis excluding the traction wheels of said vehicle, said traction wheels being outside of said slip cover whereby said vehicle is amphibious.

9. In combination with a wheeled motor vehicle, amphibious equipment comprising a readily detachable, form-fitting, flexible, water-repellent slip cover sealingly encasing the lower part including the underside of the body and substantially all of the hood and chassis excluding the traction wheels of said vehicle, said traction wheels being outside of said slip cover, whereby said vehicle is amphibious, and readily detachable water propulsion members secured on said traction wheels.

10. In combination with a motor vehicle having an engine and traction wheels, equipment attached to said vehicle whereby the latter is amphibious, said equipment comprising an exhaust pipe extending from said engine upwardly to a point adjacent the top of said vehicle for exhausting combustion gases from said engine, and a readily detachable, form-fitting, flexible, water-repellent slip cover sealingly encasing substantially all of the lower portion including the underside of said vehicle excluding said traction wheels, said traction wheels being outside of said slip cover.

11. In combination with a motor vehicle having an engine and land traction wheels, amphibious equipment attachedly converting said vehicle to an amphibious vehicle, said equipment comprising an exhaust pipe from said engine extending upwardly for exhausting combustion gases from said engine at a point adjacent the upper portion of said vehicle, a readily detachable, form-fitting, flexible, water-repellent slip cover sealingly encasing substantially all of the lower portion including the underside of said vehicle excluding said traction wheels, said traction wheels being outside of said slip cover, and readily detachable water propulsion members secured on said traction wheels.

12. In combination with a motor vehicle having an engine and traction wheels, equipment attachedly converting said vehicle to an amphibious vehicle, said equipment comprising an exhaust pipe from said engine extending upwardly for exhausting combustion gases from said engine at a point adjacent the upper portion of said vehicle, a bilge pump secured immediately below the underside of the body of said vehicle and operatively connected to the drive mechanism of said vehicle, and a readily detachable, form-fitting, flexible, water-repellent slip cover sealingly encasing substantially all of the lower portion including the underside of said vehicle excluding said traction wheels, said traction wheels being outside of said slip cover.

13. In combination with a motor vehicle having traction wheels, equipment attachedly converting said vehicle to an amphibious vehicle, said equipment comprising a readily detachable, form-fitting, flexible, water-repellent slip cover having openings therein and encasing all of the lower portion including the underside of said vehicle excluding said traction wheels, said traction wheels being outside of said slip cover, a portion of parts of said vehicle adjacent said traction wheels extending through said openings in said slip cover, and water-tight sealing means at said openings securing said slip cover to said parts extending through said openings.

14. The combination as set forth in claim 13 in which said water-tight sealing means comprises a band of resilient material secured about each of said parts of said vehicle, and a strap binding said slip cover to said band adjacent the point of extension of each of said parts through said slip cover.

15. The combination as set forth in claim 13 in which said parts of said vehicle extending through said slip cover comprise steering arms, and axle housings including stationary brake drums.

16. In combination with a motor vehicle having an engine substantially waterproofed and land traction wheels, amphibious equipment attachedly converting said vehicle to an amphibious vehicle, said equipment comprising an exhaust pipe from said engine extending upwardly for exhausting combustion gases from said engine at a point adjacent the upper portion of said vehicle, a bilge pump secured immediately below the underside of the body of said vehicle and operatively connected to the drive mechanism of said vehicle, a discharge pipe for said bilge pump extending upwardly therefrom to a point adjacent the upper portion of the vehicle and outwardly therefrom, a bracket of generally U-shape section mounted at the ends of the legs thereof to the underside of said body of said vehicle about the universal joint to provide an elongated open-ended housing therefor, and a readily detachable, form-fitting, flexible, water-repellent slip cover sealingly encasing substantially all of the lower portion including the underside of said vehicle, said bilge pump and said bracket but excluding said traction wheels, said traction wheels being outside of said slip cover.

17. Amphibious equipment for attachment to a motor vehicle having land traction members to attachedly render the vehicle amphibious as described comprising, in combination, a form-fitting, flexible water-repellent slip cover having bottom and upper portions and openings with sealing means therefor designed to sealingly encase substantially all of the lower portion of said vehicle including the hood, lower portion including the underside of the body, and the chassis, excluding the traction members thereof, with said traction members being outside of said slip cover and with parts of said vehicle associated with said traction members extending sealingly through said openings, and means associated with said slip cover for operatively attaching the latter to said vehicle.

18. Amphibious equipment for attachment to a wheeled motor vehicle to attachedly render the latter amphibious as described comprising, in combination, a form-fitting, flexible, water-repellent slip cover having bottom and upper portions and openings with sealing means therefor designed to sealingly encase substantially all of the lower portion of said vehicle including the hood, lower portion including the underside of the body, and the chassis, excluding the wheels thereof, with said wheels being outside of said slip cover and with parts of said vehicle associated with said wheels extending sealingly through said openings, means associated with said slip cover for operatively attaching the latter to said vehicle, and water propulsion members readily attachable to said wheels to provide traction in water.

19. Amphibious equipment for attachment to a wheeled motor vehicle to attachably convert the latter to an amphibious vehicle as described comprising, in combination, a form-fitting, flexible, water-repellent slip cover having bottom and upper portions and openings designed to sealingly encase substantially all of the lower portion including the underside of said vehicle excluding the traction wheels thereof, with said traction wheels extending outside of said slip cover from said openings and with parts of said vehicle associated with said traction wheels extending through said openings, means for securing the upper portion of said slip cover to the body of said vehicle, slits closable substantially water tightly by slide fasteners in said slip cover to facilitate operative attachment of the latter to said vehicle, and water-tight sealing means for said openings of said slip cover through which parts associated with said traction wheels extend on attachment of said slip cover to said vehicle.

20. Amphibious equipment in combination as set forth in claim 19, including a chassis strap adapted to extend lengthwise of said vehicle underneath the axle housings, and adapted to be secured at its ends to a front and rear portion of said vehicle, whereby, with said chassis strap secured and within said slip cover when the latter is attached, an increase in buoyancy due to space within said slip cover is obtained when said vehicle is in water.

21. Amphibious equipment in combination as set forth in claim 19, wherein said upper portion of said slip cover includes a strip section removable from the top of the hood and from the radiator of said vehicle when said slip cover is attached to the latter to permit cooling of the motor when said vehicle travels on land.

ALBERT H. BENSON.

REFERENCES CITED

The following references are of record in the file of this patent:

UNITED STATES PATENTS

| Number | Name | Date |
|---|---|---|
| 2,243,981 | Rowan | June 3, 1941 |

OTHER REFERENCES

Newspaper, Washington Post, July 16, 1941, page 4.